United States Patent [19]

Strandberg

[11] Patent Number: 6,054,999
[45] Date of Patent: Apr. 25, 2000

[54] METHOD AND APPARATUS FOR COMPUTER SUPPORTED ANIMATION

[76] Inventor: Örjan Strandberg, Torkils väg 2, S-191 71 Sollentuna, Sweden

[21] Appl. No.: 08/237,393

[22] Filed: May 3, 1994

Related U.S. Application Data

[63] Continuation of application No. 08/042,898, Apr. 5, 1993, abandoned, which is a continuation of application No. 07/571,585, Aug. 30, 1990, abandoned.

[30] Foreign Application Priority Data

Mar. 22, 1988 [SE] Sweden ................................ 8801043

[51] Int. Cl.$^7$ ................................................... G06T 15/70
[52] U.S. Cl. ............................................................ 345/474
[58] Field of Search ............................ 340/725; 395/152, 395/120; 345/122, 473, 474

[56] References Cited

U.S. PATENT DOCUMENTS

| 3,510,210 | 5/1970 | Haney ........................................ 395/152 |
| 3,792,243 | 2/1974 | Appel et al. ............................... 395/152 |
| 4,600,919 | 7/1986 | Stern ......................................... 340/725 |
| 4,752,836 | 6/1988 | Blaton et al. ........................ 395/152 X |
| 4,868,766 | 9/1989 | Oosterholt ................................ 395/120 |

FOREIGN PATENT DOCUMENTS

| 0246340 | 11/1987 | European Pat. Off. . |
| 2175729 | 12/1986 | United Kingdom . |

OTHER PUBLICATIONS

"Digital Representations of Human Movement", *Computing Surveys*, vol. 11, No. 1, Mar. 1979, By N. Badler et al., pp. 19–38.

"Antics—Graphic Animation by Computer", *Computers & Graphics*, No. 4, vol. 2, 1977, By A. Kitching, pp. 219–223.

"The Direction of Synthetic Actors in the Film Rendez–Vous a Montreal", *I.E.E.E.*, vol. 7, 1987, By N. Magnenat–Thalmann et al., pp. 9–19.

"Ohio State Pioneers Computer Animation", *Computer Graphics World*, Oct. 1985, By T. Linehan, pp. 48–60.

"Digest of Papers", 33rd IEEE Computer Society International Conference, 1988, By A. Lasko–Harvill et al., pp. 536–538.

"A System for Interactive Film Analysis", *Computer in Biology* and Medicine, vol. 9, No. 3, 1979, by M. Potel et al., pp. 237–256.

*Primary Examiner*—Mark K. Zimmerman
*Attorney, Agent, or Firm*—Young Law Firm, P.C.

[57] ABSTRACT

A method for producing computer processed animation includes a work station composed of a computer and peripheral equipment which produces a graphic movement sequence for a cartoon figure, by compiling a recording of measured data from strategic parts of an actor, and storing in a memory information concerning the figure to be animated. The figure is divided into a plurality of sections which are movable in relation to one another. Prior to figure compilation for producing an image of the figure, the measured data recording for each section is obtained in the form of a space angle. Prior to compiling each section, a grouping of a predetermined number of perspective drawings is stored, in digitized form, in a respective area of the memory, each grouping in a plurality of mutually different space angle positions. A memory area of interest representing a perspective drawing of one of the sections can be addressed with the aid of information relating to the space angle obtained from the measured data recording for the section concerned. The figure is compiled in the compilation image in accordance with a predetermined sequential compilation schedule, section after section, where each subsequent section is added to the nearest proceeding section at a joint location, to build the sections.

1 Claim, 3 Drawing Sheets

METHOD AND APPARATUS FOR COMPUTER SUPPORTED ANIMATION

This application is a continuation of application Ser. No. 08/042,898, filed Apr. 5, 1993, now abandoned, which is a continuation of application Ser. No. 07/571,585, filed Aug. 30, 1990, now abandoned.

TECHNICAL FIELD OF THE INVENTION

The present invention relates to a method and apparatus for producing animated film, in which the movements of live actors and actresses are recorded in combination with data stored information relating to the figures or characters to be animated.

BACKGROUND OF THE INVENTION

The traditional production of animated film is encumbered with the time consuming and difficult task of creating figures which move with credible fluidity and "humanism". Many cartoon films are produced by the so-called rotoscope technique, in which subsequent live actors and actresses are filmed and a drawing is made of each film frame. Cartoon films which have been produced by this technique include "Snow White and the seven dwarfs", "Cinderella", "Pongo and the 101 dalmations", "Jungle Book", etc. Although this method produces excellent results, it is both time consuming and expensive. In recent years endeavours have been made to simulate human behaviour with the aid of data technology. This task has proven to be almost impossible in practice. It requires the computer to be programmed with information defining the entire body-behavioural patterns of the person concerned. It would require a computer capacity of astronomical proportions to manage a control system of this magnitude.

Partial solutions have been devised, e.g. animating systems which recreate lip movements subsequent to recording speech sound in the computer. If the actor/actress is silent, however, the computer-generated mouth remains closed. Lip animation is rigid and restricted solely to actual speech.

U.S. Pat. No. 3,510,210 describes a technique for producing animated film wherein the movements performed by an actor are fed into a computer, by recording a multiple of optically discernible reference points on the actor in relation to a background reference; wherein the recorded reference points are compared at regular intervals with pre-stored batches of figures drawn in mutually different postures and positions, so as to select the batch which closest resembles the posture, attitude, etc. of the actor at the time chosen, and wherein there is generated from the computer a series of pictures or images of the cartoon figure with a body position or posture corresponding to that of the actor concerned, at the selected recording times. The pictures produced are preferably copied as Xerox transparencies, which are modified manually and supplemented with suitable background material, etc., in a conventional manner, to form cells which are then photographed.

The animating technique described in the aforesaid U.S. Pat No. 3,510,210 has a number of deficiencies which render it unsuitable for the production of high-quality animated film. One decisive deficiency with regard to the area of application envisaged is that the technique only permits 2-dimensional "upfront"-recording of the actor's movements and is therewith limited solely to lateral and vertical movements of the cartoon figure, and also that there are no permissible degrees of freedom which enable the figure to be covered from different "camera" angles. Furthermore, no information is given as to the possibility of computer-integrated processing of recordings of the actor's movements, interaction of the figure with objects and other figures, selection of body assemblage of the animated figure, integration with background, creation of shadows and reflexes, etc. In those instances when these functions are mentioned, it is obvious that they are intended to be inserted manually in a conventional manner, with the aid of the cells formed by producing Xerox transparencies.

U.S. Pat. No. 3,792,243 teaches a method for encoding positions of a mechanism, in which a doll having sections which are adjustable to different angular positions is positioned above a coordinate plate and pickup points of the doll projected onto the coordinate plate are encoded and recorded by a computer. A series of projections of pickup points of the doll placed in different positions may be taken and computer processing can interpolate between poses to produce an animated sequence.

U.S. Pat. No. 4,600,919 teaches a method of making in-between pictures between lay-out pictures, called key drawings. The figure to be drawn has one or more joints and each joint has associated therewith a set of limb-defining vectors. An operator working at a console is able to control the three-dimensional position, rotational orientation and scale factors of a local coordinate system in which the limb vectors are placed. The operator is therefore able to control the animated movements provided by the in-between pictures.

OBJECT OF THE INVENTION

The object of the present invention is to overcome and reduce the limitations of known computer-supported character animation systems with respect to the number of possible degrees of freedom, and to provide for 3-dimensional representation in both the capture of organic movement data and in graphic figure representation, and also to produce so-called character animation by storing artist-made key drawings in sequential representation covering the full sphere of observation of each jointed body segment or part so as to enable movement data captured from a human actor to be taken from a corresponding movement sequence of the animated or cartoon figure.

The invention does not include the method by means of which movement data is captured per se, or the manner in which the actor and the prestored figure are divided into smallest articulated part volumes. The invention distinguishes from known data animation systems in which figures and objects are constructed as 3D-defined "solid" objects and in which animated movements are programmed from a keyboard, mouse or some other form of communication unit.

A primary object of the invention is to provide a data-supported animation system which will enable the actions of an actor to be directed and, at the same time or at short time intervals, will also enable graphic figures or characters which reproduce or relive the actions of the actor to be created and presented on a television monitor for instance.

Another object of the invention is to provide an animation system which will afford a wide scope with wide freedom of expression on the part of the animator on the basis of the fundamental movement pattern of the actor concerned.

These and other objects of the invention will be more apparent from the following description.

SUMMARY OF THE INVENTION

The aforesaid objects of the invention are achieved by means of the inventive method of animation and the animation apparatus defined in the following claims and described in more detail herebelow.

The invention is based on the understanding that each individual person can be considered as a single entity which comprises a multiple of segments joined at fixed or jointed locations, where each segment has an inner attachment point in the center of a sphere and an outer attachment point at some location on the surface of the sphere. In turn, the inner attachment point is the outer attachment point for another graphic segment and the outer attachment point is the inner attachment point for the next segment, and so on. Correspondingly, a figure which is to be animated can be divided up into corresponding segments, defined in accordance with joint limits, where each joint is allotted a unique control code.

According to the invention, the performance of the human actor is directed on the basis of this division of measuring points corresponding to the aforesaid joints, the three-dimensional positional coordinates of these measuring points being registered and later used to control the development or presentation of the cartoon figure. The invention is thus based on the concept of taking positional and movement data from a live actor in real time and generating from said data a corresponding animated sequence of a computer-stored cartoon figure. However, this is only the basic concept of inventive animation system and the system will, in addition, also contain comprehensive process functions, as described in more detail herebelow.

DESCRIPTION OF PREFERRED EMBODIMENTS

As before mentioned, the present invention relates to a novel method of producing animated cartoon film with a starting point from a human actor whose movement patterns are registered in digital form for the purpose of generating corresponding movements of a cartoon or graphic figure stored in the memory of a computer.

The movements executed by the actor are identified and recorded, preferably in respect of six separate sectors and segments included in said movement group, i.e. head, torso, left arm, right arm, left leg, right leg. The cartoon figure has been stored in the form of a multiple of key drawings for each body segment, each of which has been allotted a part code for a contemplated, continuous pattern of movement. For instance, when the actor's left arm is located in a certain position, this arm position is recorded and identified as being representative of the positional values of the joints involved. These values call corresponding, computer-stored arm segments, or are used to construct in the computer corresponding arm segments from closely resembling key drawings. In the figure assemblage shown on a monitor screen for instance, the arm drawing is placed together with the other parts of the body at their respective joint positions and the unprocessed result becomes the cartoon figure which moves in the manner of the actor.

STORAGE OF FIGURE DATA

The chosen cartoon figure is divided up preferably into corresponding sectors, head, torso, arms, legs and the segments included therein. An artist produces for each segment as many key drawings as are required to describe all movements to be performed by the body segment concerned. Successive key drawings will preferably be so similar to one another as to enable the computer to assemble intermediate positions from two mutually adjacent drawings. When entering the data into the computer memory, those regions which are later to be coloured are preferably provided with a code which will enable the pigmentation (color) of the figure to be changed and modulated in accordance with background or surroundings.

RECORDING OF ACTOR PERFORMANCE

An actor performs in front of an optical or electromagnetic recording system which records the actor's movements continuously from at least three measuring angles and transmits the movement data to be registered in a computer in the form of movement vectors for a plurality of joint locations and their mutual angular relationships. In this digitalized form, the movement positions of each segment become a code which can be used to summons the graphic equivalent stored in the computer memory.

ASSEMBLAGE AND OUTPUT

When storing the segments of the cartoon figure, the joint location of each segment is given as a respective link to the next body joint. The figure is assembled, or put together, with the aid of this data, together with information concerning the mutual forwardly lying/rearwardly lying relationships of the segments, and the figure is generated in film/video format.

PROCESSING FUNCTIONS

The actor shall be considered solely as a data producer and the constitution of the actor's body has no significance whatsoever with respect to the appearance of the figure, since the system does not measure proportions, but solely the mutual angular relationships of different body members and joints. In other words, positioning of the measuring points is local and related to the nearest inner joint. The result obtained when purely scanning the actor shall be considered as basic material for the processing, revising and modulating facilities included in the system.

The speed of figure movement can be influenced, or determined, by the actor scanning density. The standard film/video speed is 25/29 frames per second. The speed of figure movement can therefore be increased or decreased, by recording actor movement at a higher or lower frame speed.

The whole or parts of the movement dynamics can be controlled by recording body movements at a given multiple. For instance, all horizontal movements can be recorded at a multiple of 1.2, or all arm movements at a multiple of 1.4, etc.

Furthermore, a constant value may be added to the positional code of a segment and therewith influence its constant "working position" in relation to the horizontal or vertical plane, e.g. so as to obtain an inclined position.

The movement dynamics can also be influenced by the introduction of so-called conditional features. For instance, if the actor moves his head faster than a given speed, the sequence of movements prior thereto are recorded in real time, whereas subsequent movement is either recorded with a multiple or is delayed for a given length of time and then released in a compressed and shortened form.

Such conditional features can also be used to "envelope-format" the movement dynamics, i.e. define a limit value which, when exceeded, affords adjustable manipulation in time compression and multiple amplification. It is possible to manipulate individual sectors, movements in the X-,Y- or Z-directions, or the whole.

By defining a given movement, the movement can be replaced by a preprogrammed movement, with the aid of said conditional features.

Several mutually different and simultaneously active cartoon figures can be controlled with the aid of data obtained by recording actor-movement three-dimensionally. These figures can perform from mutually different perspectives, may be mutually displaced in time and may have mutually different appearances, but the data responsible for the individual movement patterns may come from one and the same source of movement.

Such parameters as hair or hats can be stored separately in different movement dynamics and later summoned with the aid of conditional features and incorporated in the figure. (For instance, if the figure moves faster than iii/sec, incorporate hair-sequence iii).

A scene which entails interplay between figure and objects can be performed with a "dummy" included in the system and provided with position and movement identification marks. Subjects which are not easy to record, e.g. liquids, can be positioned marked with a dummy (e.g. a ball emptied from a bucket), which when assembling the figure marks position, direction and speed of the stored animated water sequence to which it relates.

Interplay between two actors can be recorded separately with each actor. The position of the actor's partner can be marked with a defined dummy so as to enable the mutual positions of the actors to be coordinated when assembling the figure.

These manipulations can be made "on-line" when recording the actors, although it is important in practice to be able to advance by trial and error and the possibility to experiment is very significant, and consequently it can be beneficial to store the unprocessed performance of the actor, both visually in video form and in coordinate form in a computer memory, so as to be able to modulate and process said performance at a later opportunity.

SPEECH AND FACIAL EXPRESSIONS

Speech and facial expressions can be advantageously recorded separately (as in the case of traditional dubbing). The appropriate data can be inserted in the output, so as to control the speech and facial expressions of the graphic figure at the angle earlier determined by the position of the actor.

The mouth movements of the cartoon or graphic figure can be generated either from an analysis of the vocal and consonant sounds uttered by the actor, for instance in the manner proposed in U.S. Pat. No. 4,260,229, or preferably by optically marking the actor's mouth and analyzing and identifying the shape of the mouth against an elliptical model whose axes can be varied. The model is used to define various different shapes compatible with various expressions or attitudes of the human mouth. Each of these mouth expressions is given a sequential identification code so that assemblage can be effected from the stored graphics corresponding to the identified shape, or expression.

In the case of complicated mouth configurations, such as duck bills, etc., for instance, the feature can be assembled from a computer generated 3D-model produced as a linear graphic in accordance with the artist's configuration and the mouth shapes controlled from the actor's lip movements.

The mouth can be marked either at optically detectable points for analysis in a CCD-camera system, e.g. SELSPOT, or with discernible colour markings in the form of dash-marked lips which are later analyzed according to shape changes with e.g. so-called SNAKE software (Schlumberger Palo Alto Research). Similar to the reproduction of body movement, the dynamics of mouth movement can also be manipulated.

Data relating to the shapes and forms of the eyes and eyebrows is also captured in a similar manner, with geometric reference to an elliptic form, and assemblage is effected from a stored graphic representation. With regard to the analysis and transmission of iris positional data, capturing solutions are known by means of which a circular shape can be identified and positioned within an ellipse.

EDITING OF FIGURE AND IMAGE

In order to enable a long movement sequence to be shortened or spliced without increasing the speed of the movements, the system is able to search for the most similar movement positions on both sides of the splice, sector for sector. In the case of the preferred embodiment, this involves splicing the sectors at six mutually different occasions when respective positions lie optimally close to the spliced sequence.

The system can also combine traditional animation technology, in which long sequences are drawn and entered into the computer memory and the figure composition defined with regard to speed, proportions and position in the image ("dummy"-related or stationary). Before arriving at the final result, the producer has the same possibilities image-wise as in traditional film/video production, cutting or viewing, split screen, tilting, masking, full image, half image and close-ups, etc.

Coloring of the figure is related to the areas defined when storing. These areas can then be modulated in desired hues, shades, nuances, etc., or conditionally based on surrounding colour backgrounds.

The system also includes the figure in an environmental or background illustration and, furthermore, a figure shadow can be generated on the basis of a contemplated light angle, from the 3-dimensional position of the actor. The figure shadow is generated from the same data store, but with transparent photocomposition and graphically compressed horizontally.

The background illustration is stored as a sequence, when it contains moving elements. It can also be stored at different depth levels, so as to allow the figure to perform in front or behind the elements in the environment.

It is also possible to store photographs instead of drawings according to the same system, with key positions and sectors. In this case, the actor's movements can then be caused to control human figures, puppet-like figures, objects, animals, etc.

The inventive animation system will quickly give a viewable result and optimum naturalness in the movement patterns of the figures, and also affords positive editing and processing possibilities and a wide degree of freedom in experimentation and modulation in comparison with traditional film.

ALTERNATIVE IN-FEED

To provide for maximum flexibility and artistic utility, the inventive system can be provided with alternative parts for other kinds of input data than actor recordings, e.g. light pens, "mouse", digitaliser, etc.

In the case of post edition with, e.g., mouse, the editing process is effected for two grids for the X and Y planes respectively.

The assemblage of the cartoon figure is addressed sectionwise to each of three defined depth planes: Centre, Front or Back. This can be effected automatically in accordance with conditional features relating to the mutual positions of the sectors during the recording process.

BRIEF DESCRIPTION OF THE DRAWINGS

The invention will now be described in more detail with reference to the accompanying drawings, in which.

DETAILED DESCRIPTION OF THE INVENTION

Figure 1:
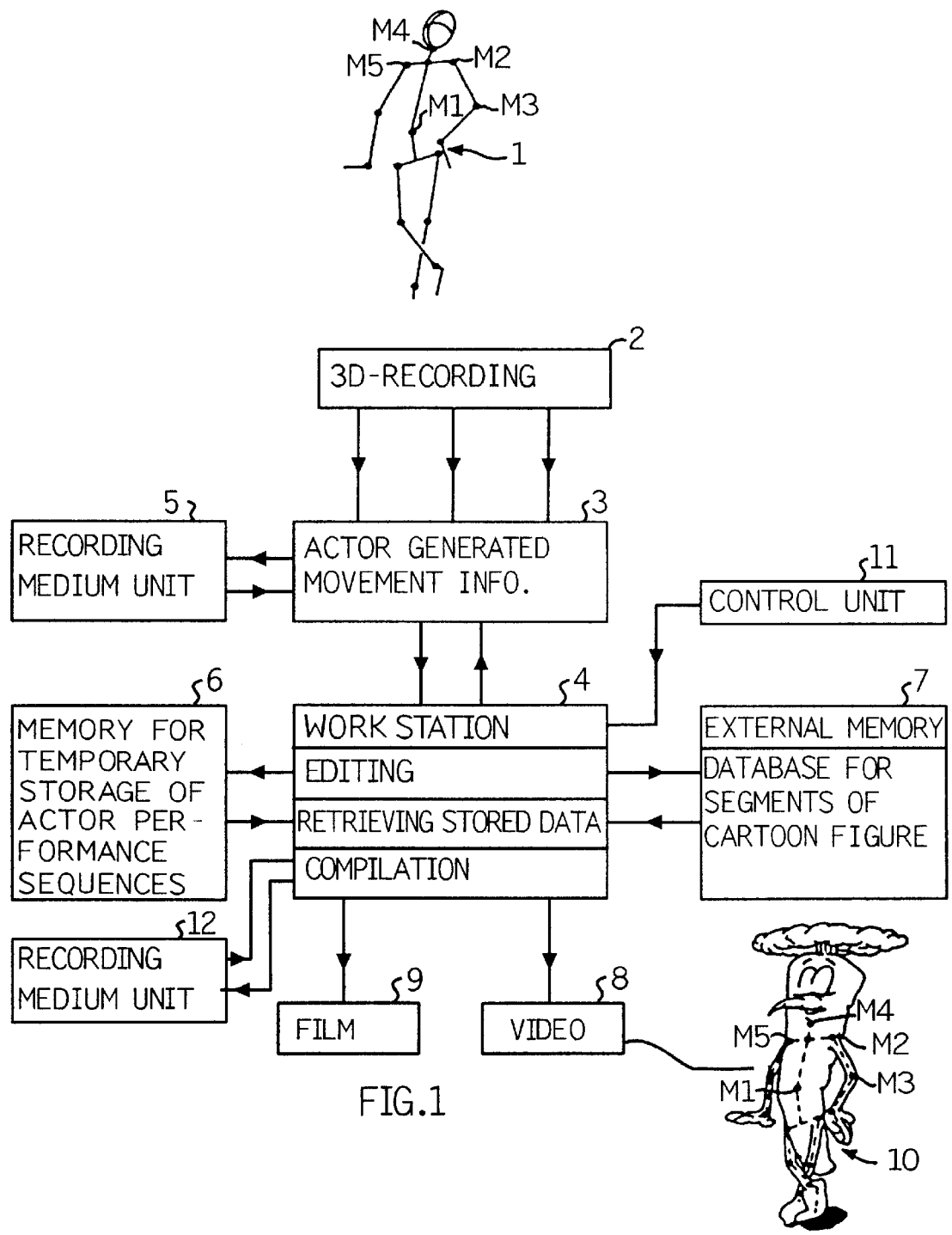
FIG. 1 is a block schematic of one embodiment of an arrangement for carrying out the invention.

FIG. 1 illustrates schematically an actor 1 in respect of whom a plurality of measuring points M1, M2, M3, etc. are recorded. A recording device or system 2 records the positions of these points in space. The recording systems itself forms no part of the present invention. There are several different types of systems on the market intended for recording three-dimensional (3D) information relating to the movements of an actor during an event sequence and for storing this information in digital form in a computer memory which can be used as the recording system 2 in conjunction with a special actor's costume, e.g. DATASUIT, or other recording systems in which measuring points are applied separately to the actor, e.g. SELSPOT. Both of these systems are particularly adapted for image sequence recording and are able to provide a list of 3D-coordinates for each of the actor's joints and for each movement registered in a recorded sequence. It is a particularly essential feature of the invention that each jointed section of the actor can be registered in respect of its angular position in space. The aforementioned system DATASUIT functions with fiber optics in combination with electric 3D-sensors and produces absolute cartesian space coordinates. The aforementioned system SELSPOT works with scanning cameras.

The recording system 2 can comprise a combination of several different kinds of recording systems, of which the recording system best suited for the recording concerned is either used on its own or together with some other kind of recording system. There can be used a known system intended particularly for indicating complicated movements, e.g. finger movements, such as the DATAGLOVE system for instance. Different systems are also to be found for recording segments in facial expressions, such as eye and mouth movements, which can be utilized so as to enable the result of such recordings to be combined with the invention.

Recording in the recording system 2 is effected on-line, e.g. with normal film and video picture display standards with 25 or 29 movement recordings per second or at twice this frequency, during the sequence in which the actor performs. Each movement recording will then include a recording of all measuring points. The recording system 2 feeds the actor-generated movement information to a unit 3 which either passes this information straight to a work station 4 or to a recording medium unit 5 suitable for the purpose. The work station may have the form of a PC-compatible computer for instance, or may also be a graphic computer, e.g. a Hitachi GDP.

The record medium in the unit 5 may be any type of fixed memory which is capable of storing large quantities of data, such as a floppy disk, magnetic tape, CD-disk or the like. This manner of storage enables suitable actor performance sequences to be recorded at appropriate times and then summoned from a filing system when required. In this case, the unit 3 may function as a read-unit which is controlled from the work station 4 to read information from the recording medium in the unit 5 and to transfer this information to the work station, where the information is stored in a specific area of a temporary working memory 6 allotted for this purpose. Connected to the work station 4 is an external memory 7 which includes a data base containing segments of the cartoon figure or figures to be animated.

Figure 2:
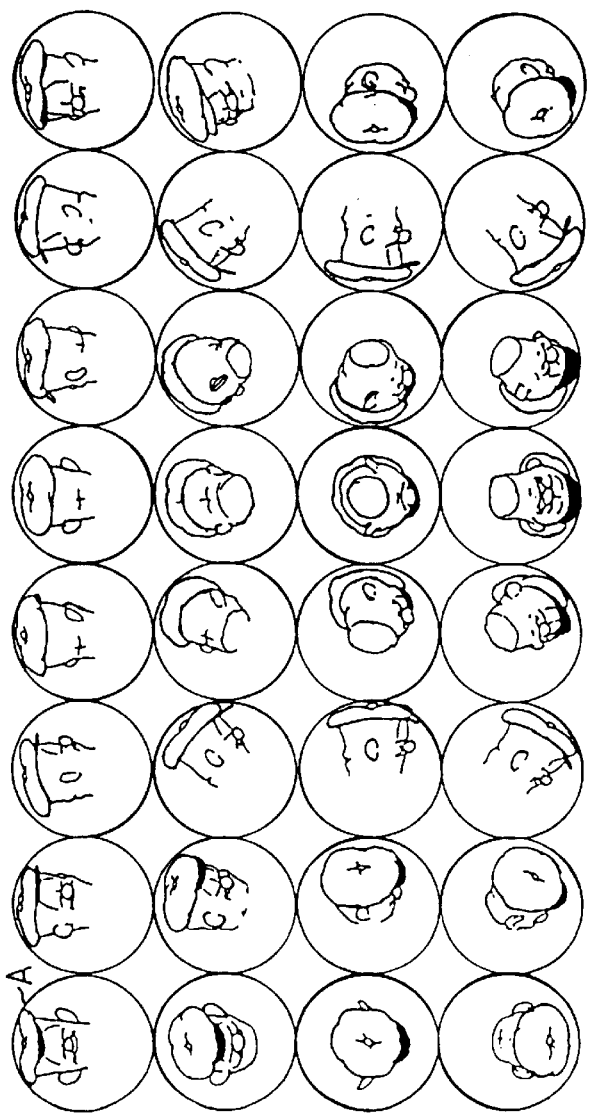
FIG. 2 illustrates an example of one sequence of stored drawings (graphics) for one section of an image.

FIG. 2 illustrates a sequence of drawings of the head of a figure stored in digitalized form and with the head shown at different space angles. A significant feature of the invention in this regard is that the stored segment drawings are representative of different positions within the sphere of a performance, i.e. the segments are not stored solely as two-dimensional elements, but that each segment is represented in the various perspective configurations which it is capable of assuming and are drawn by an artist on a graphic template which describes the potential three-dimensional radius of movement of the segment. Information relating to other body segments, such as upper arm, lower arm, hands, etc., is stored according to the same system. Head images are the most illustrative in this context. The images of an upper arm, for instance, substantially have the appearance of a tube of different lengths drawn in perspective from the starting point of a central position representative of one of the arm joints, depending on prevailing angular positions in space. Naturally, the images of each segment are stored in accordance with a logic system which enables the computer to address readily the correct image in a stored sequence for each frame to be recorded, when the space angle of corresponding actor segments in corresponding images of the actor is known. An example of such a logic system is described below with reference to FIG. 6.

The faces in the sequence shown in FIG. 2 all have the same expression. In order to appear to be alive, the cartoon figure must be given different facial expressions. The eyes, eyebrows, mouth and optionally also the cheeks of the subject (the actor) are also marked. Similar to the aforegoing, key records are stored of the movement spectrum of the cartoon figure. The facial expression of the actor, e.g. eye movement, eyebrow movement and mouth movement can be recorded separately in the recording arrangement 2 at one and the same time and are also stored in the memory 6 on the occasion of assembling the cartoon figure.

Figure 3:
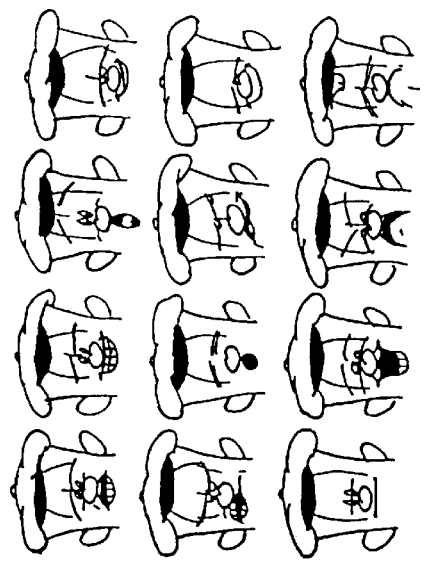
FIG. 3 illustrates an example of stored variants of one of the drawings in FIG. 2.
Figure 4:
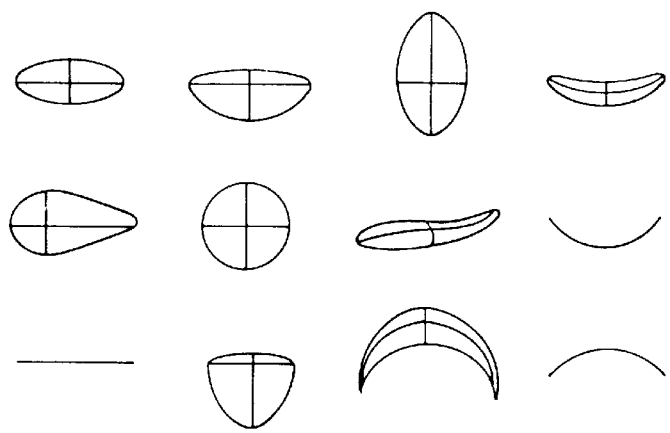
FIG. 4 illustrates an example of stored variants of standard geometric shapes, for comparison and calling up suitable mouth shapes for a cartoon figure.

FIG. 3 shows the face A of FIG. 2 in larger scale and illustrates a sequence in which the face has different expressions, within one and the same view angle. Alternatively, mouths can be taken from a separately stored mouth shape index, e.g. the index illustrated schematically in FIG. 4. The length of the mouth and the extent to which the mouth is open or closed, referred to hereinafter as mouth height, can be adapted to the prevailing angular position of the head in space with the aid of a specific algorithm. This algorithm is either stored in the external memory 7 connected to the mouth index, and then adapted quite specifically to the figure concerned, or is incorporated in the software installed in the work station, in which case it will be similar for all types of mouth indexes. When possible, a corresponding procedure can be adapted to produce a full face expression, as illustrated in FIG. 3, which enables specific fixed points to be marked in relation to the head shown in FIG. 2.

In the case of the mouth, it is practical to start from a convex ellipse having two axes X and Y, for the purpose of determining mouth length and height dimensions. Because it is possible to displace the point at which these axes intersect, therewith altering the position of the center of the ellipse, a great many facial expressions can be created. To this shall be added the possibility of "twisting" the convex ellipse about an imaginary or contemplated horizontal axis, which raises or lowers the corners of the mouth. It should be noted that this geometric model can only be used to identify one phase of a continuous movement for the purpose of summoning its programmed counterpart. Consequently, the ellipse per se shall not be transferred.

The actor's, or subject's, mouth is preferably marked with two clear (straight) lines, alternatively with optically readable points. When this variant has been included in the preprogramming of the figure, the subject's teeth can also be included in the lip expression. As in the case of body reproduction, the mouth dynamics can also be reproduced to a greater or lesser extent, this extent being dependent on the multiple used in transmission.

Particularly in the case of facial expressions, the work entailed in drawing, for instance, the mouth to cover all conceivable expressions and all 3D-positions for each individual expression would be extremely excessive. In such cases, it may be more expedient to draw only one picture for each expression concerned and then to compose for said each expression a mathematical 3D model which is processed with the aid of a suitable algorithm in the work station, such as to provide the 3D-position concerned. In this case, each expression model has a number of given points and/or lines (dashes) which shall be transposed onto corresponding points and/or dashes on that part of the face where the mouth having the intended expression or mimetic concerned. The size of the computed mimetic position is adjusted, so as to enable said adaptation to be effected.

Eye movements are recorded in a similar manner. Suitable identification models will also in this case have the form of a convex ellipse. Positioning of the human pupil of the master model, or actor, controls the predrawn position in accordance with a known method. Since the method used in this regard is known, it will not be described here.

Figure 5:
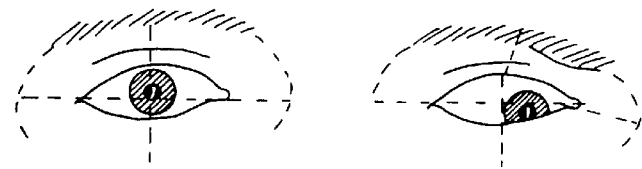
FIG. 5 illustrates differences between the eyes of an actor and graphic variations thereof.
Figure 5:
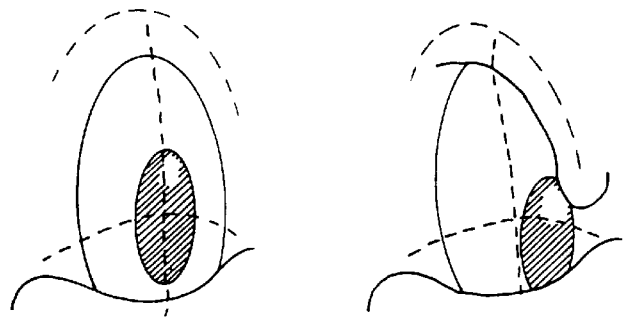

The eyes in the top row of FIG. 5 depict camera recordings made by a camera focussed on the actor's eyes, whereas the eyes in the bottom row each correspond to a graphic variant. The centres of the eyebrows are in relation to the centre of the "eye-ellipse". The geometric figure may be a compensatable arc having a pair of modulating variants. It is conceivable that in some positions, the shape of the eyes of the cartoon figure will not depend on the position of the eyebrow, as shown by way of example on the right of FIG. 5.

Returning to FIG. 1, the work station thus functions such as to, for each frame to be recorded, assemble the figure such that said figure, with a starting point from a starting point M1, which is preferably the lower part of the figure's torso, one of the actor's stored segments which departs from said starting point, is read from the memory 6, e.g. the torso part. In the illustrated embodiment of FIG. 1, this part has four measuring points M1, M2, M4, M5 which are in fixed relationship with one another. The memory 6 either has written thereinto calculations which relate to torsion attitudes, e.g. torso-bending and twisting, or the cartesian coordinates of the measuring points. The work station 4 is programmed to calculate the correct address for fetching a stored torso image from the memory 7 and storing this image temporarily in the memory 6, on the basis of the mutual relationship of the measuring points read from the memory 6. The right upper arm, located between M2 and M3, is included subsequent hereto.

The work station searches the memory 6 for the section between the points M2 and M3, which can be stored in the memory either in the form of the coordinates of said points, in which case the work station computes the prevailing angular position, or directly as an angular position which, for instance, has been pre-calculated in the unit 3 or as early as when being recorded in the unit 2. Thus the time at which the calculations for an individual segment are carried out and in which unit of the system is a matter of relatively free choice and is decided by the circumstances prevailing in each separate case. One essential factor in this connection is that the work station 4 is able to obtain on the basis of the information stored in the memory 6 with respect to a segment for an image in question, an address with which there can be taken from the memory 7 an image of the segment entailed in the correct 3D-position concerned, either immediately or after processing the image in a predetermined fashion. For instance, if the upper arm, located between points M2 and M3, is taken from the memory, the upper arm is positioned in the image such that the point M2 on the torso and the point M2 on the upper arm (this point being located centrally in the movement sphere of the upper arm) will overlap one another. Each joining or connecting point is called a joint.

The work station thus edits in the memory 6, obtains from the data stored therein an address by means of which correct image parts can be found in the data base memory 7 and joins the thus obtained image parts in a selected sequence and then presents the assemblage on one or more display units, such as a monitor 8, or on a projection area of a film. FIG. 1 illustrates to one side of the monitor, an exemplifying cartoon figure which originates from the measuring points M1,M2, etc. on the actor 1. The matchstick image 1 (FIG. 1) is shown in broken lines in the image 10 for reasons of illustration, although it will not, of course, be included in the graphic figure in reality.

The figure may, conveniently, first be drawn on the monitor 8 during the animating procedure. The operator can then make any necessary adjustments through an operator control system 11, such as a keyboard, a mouse, a digitalizer board, or the like. The completed graphic figure can then either be stored temporarily in the memory 6 or in a record medium of some suitable kind, such as a floppy disc or the like, located in a record medium unit 12, or may be drawn on film in a unit 9. For instance, long sequences of a performing graphic figure may be stored in the record medium or carrier in the unit 12 and fetched at a later point in time and then assembled image by image with one or more similarly stored figures and/or backgrounds, to produce an assembled presentation, although it will be understood that each sequence of the assemblage or presentation may be stored in a second medium in the unit 12.

As shown in FIGS. 2 and 3, at least each of the segments which are to be jointed or hinged together is stored in its various different angular positions in the form of circles in which segment variants are drawn and also the joint by means of which it shall be joined or hinged to the immediate preceding graphic segment's outer pole as a center, in accordance with a predetermined schedule. It can be said that all the circle images of a segment form the movement sphere of the segment. It is the circle image which is moved over and drawn in its entirety (naturally, without the circle line). The next joint, corresponding to a measuring point on the actor, is to be found at some location within the circle or on its circumference and is also found marked or labelled digitally in connection with the circle image in the memory 7, so that the work station is able to read-out said circle image and calculate the position in the image of the next joint, i.e. joining point, on the basis of the position in the image of the aforesaid joint and position of the next joint.

Although it is practiable to store all segment images in the form of circle images, it will be understood that each joint can, instead, be stored solely as a drawing which departs from a central point.

Figure 6:
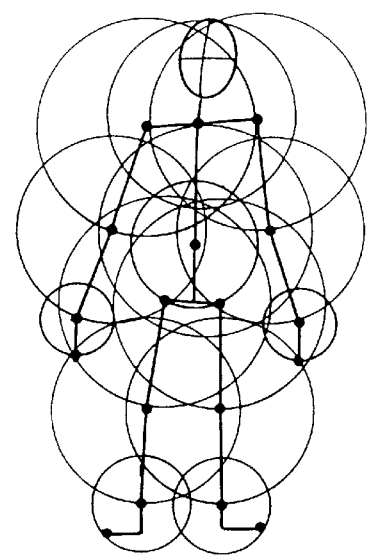
FIG. 6 shows graphically a matchstick figure with circles, used to illustrate the invention in respect of one example.

FIG. 6 illustrates an assembled matchstick man in that instance when all joining points to immediately following segments lie on the circumference of the stored circle, i.e. the matchstick man adopts a position such that all of the measuring points lie in a two-dimensional plane (so-called upfront recording), which is actually very unusual in practice.

EXAMPLE

This example refers to FIG. 6 and describes how a storage schedule for an actor with graphic or drawn segments can be carried out in reality.

The recording of an actor is marked at 18 points: Hip bones 3 points, torso 4 points, head 3 points, left and right arms and left and right legs 2 points each. These 18 points characterize 15 movement spheres (In this case, fingers can be constructed as a subject with contours. 20 measuring points are required, if fully integrated fingers are desired.)

The figure is stored in segments: head=one segment; torso=one segment; hips=one segment; each arm=three segments; each leg=three segments. This results in nine event spheres, where arms and legs are generated in left and right positions from mutually the same data base material. In turn, this results in the storage of 9×32=288 key drawings.

The movement sphere of each body sector is defined as a spiral in three planes, where X describes a 360 degree horizontal radius, Y describes a corresponding vertical radius and Z describes a "depth" radius. The Y-position is shifted through one degree with each completed revolution in the X-direction. The Z-position is shifted through one degree with each completed revolution in the Y-direction.

If the movement resolution is determined to 240 positions per revolution and axis (=1.5 degrees) the theoretical numerical spectrum will be

| for X: 0–239 | in intervals of 1 |
| for Y: 0–57360 | in intervals of 240 |
| for Z: 0–13824000 | in intervals of 57600 |

The values denote all of the positions in which an object can be viewed. However, the movement spectrum is repeated when Y and Z have reached half their respective radii, and hence the high numerical values are more descriptive of the numerical identification than the data quantity. The drawings of the desired figure are scanned in as key drawings for the seven (7) body sectors. By "key drawings" is meant drawings in sufficiently dense position frequency for the computer to be able to construct those which are intermediate. According to the aforedescribed algorithm, 32 key drawings per sector should be sufficient basis for visually presenting the whole of the movement spectrum.

The key drawings are then stored in the data base 7, together with a numerical value in intervals of 30 in the X-direction, 7200 in the Y-direction and 1728000 in the Z-direction.

By handling the movement axes as powers in three stages, it is possible to define a continuous course of movement while giving only one value at a time, which is a prerequisite for being able to match the movement data of the actor with the movement data of the stored figure.

The recording system requires a sampling speed of maximum 9 kHz, in order to read a maximum of 50 points times 3 (X, Y, Z) 60 times per sec. Added to this is the need for a buffer which is capable of holding the 180 000 parameters generated in one minute (=a/Mbyte). This buffer is preferably a hard disc. The actor's parameters are stored digitally, e.g. on a video tape.

The system views a human figure as a multiple of linking spheres. Each joint describes a movement sphere in relation to the next inner joint or pivot point. For the purpose of defining each joint position isolated in relation to its "center", the coordinate value of the inner joint is substracted from the coordinate value of the outer point at the sampling moment. This results in "zero setting" of the centers. An overlapping sphere is described from a centre point in the hip bone of the actor. The angle of incidence of the contemplated camera on the figure to be drawn is determined by adding or subtracting the coordinate values of all of the joints or pivot locations. The angle of incidence of a contemplated light source is determined in a similar manner. The figure's projected shadow is created from another figure on the basis of the light coordinates. The figure is generated as a single-dimension projection which is "folded" in the longitudinal direction of the light in the point of contact of the original figure with the supporting surface. This flat "figure" is then colored transparently and homogenously.

For the purpose of structuring insertion of key drawings into the data base 7, the user is provided with a number of "grids" or templates. These are three-dimensional graphic foundations which ensure that proportions and positions will agree and that linking to the next body part is defined in the digitizing process. This can also be constructed as an integrated program routine stored in the data base and fetched by the work station 4, wherein the animator gives the figure measurements for different body sectors and thereafter either brings up respective "grids" on the screen of the monitor 8 as a foundation for "drawing" the body parts directly with the aid of the control unit 11, which may have the form of a so-called digitizer-board, or on paper from a connected printed for traditional drawing processes. The "grid" may have the form of a squared globe, where positioning of the body sector is based on the center of the globe, said center defining the link-up with a previously drawn body part. Each "grid" has a marking for the extrapolated position and its predefined numerical code.

Initial drawings for each sector in initial X-, Y- and Z-positions together give three-dimensional, i.e. perspective, contour information, so that, for instance, light shadows, etc., can be included at a later stage.

Figure 7:
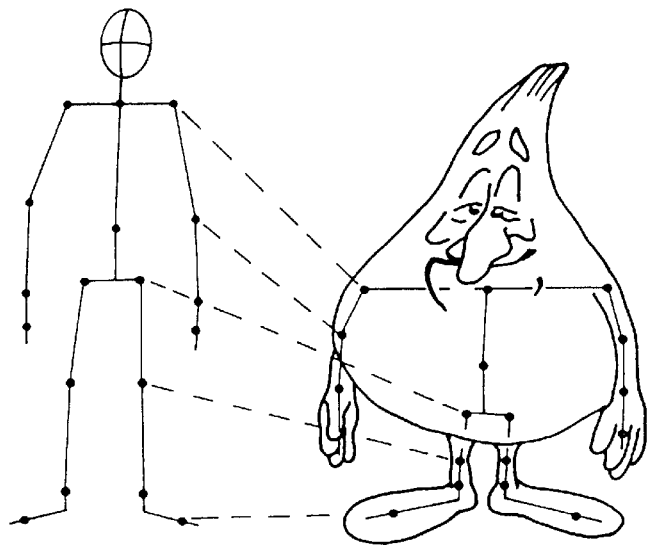
FIG. 7 illustrates a figure whose proportions are quite different to those of the actor.

As illustrated in FIG. 7, it is not necessary for the respective segments of the graphic figure to have the same proportions as those of the actor used as the master model. Since it is only the angular position in space of each segment of the model, or actor, that is utilized for drawing of the figure, and not the mutual relationships between the cartesian coordinates of the measuring points or the mutual relationships between the lengths of the segments, a freely chosen cartoon figure can be animated readily and with good results by means of the method according to the invention. The central line proportions of the figure, compared with the model, are adapted in the work station 4 to the specific body constitution of the figure.

Figure 8:
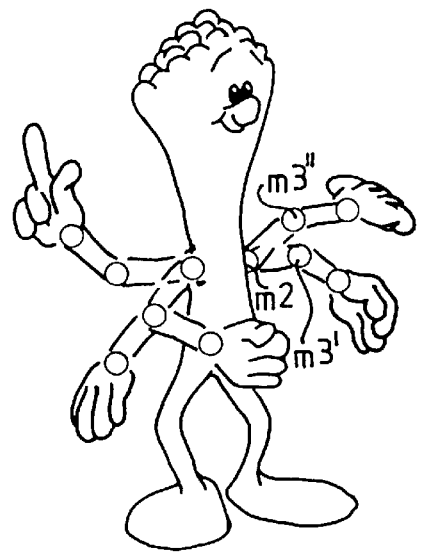
FIG. 8 illustrates how a figure can be changed from one graphic image to another, and also illustrates movement of the figure.

FIG. 8 illustrates an example of a cartoon figure assembled from stored segments. The example shows the figure with mutually different arm positions, but with the remainder of the figure stationary. The various arm joints are marked as circles in the figure, such as for instance point m2, which is static for both arms—positions of the right arm, and point m3' for the arm in one position, and point m3" for the arm in another position.

Many modifications can be made within the scope of the invention. For instance, the block schematic of FIG. 1 can be changed in various ways, as will be understood by the person skilled in this art. For instance, the element 3 can be incorporated in the work station. Alternatively, the elements 2, 3 and 5 for recording purposes may be a separate unit used solely for registering actor movements when recording movement sequences. In this case, the work station and peripheral equipment may be placed in a location which is physically different to that of the recording unit. In this case, the record medium containing actor information can be optionally read into the work station from the record medium unit 12. Also, the memory 6 may optionally have the form of a data base into which long actor performance sequences can be written.

Naturally, the inventive method can be used to animate moving objects other than those based on human figures or animals. Examples of such moving objects include different types of machines, water falls, medicinal systems, such as blood circulating systems, plants in high winds, etc.

What is claimed is:

1. An arrangement for producing computer processed three-dimensional animation comprising:

a) a work station (4) comprising a computer and peripheral equipment producing each image in a graphic movement potential for a graphic figure divided into relatively movable image sections;

b) a first memory region (7) storing data recordings of a plurality of three-dimensionally represented perspective drawings of each image section of said graphic figure to be animated in digitized form at mutually different addresses in a respective memory area in said memory region (7), each said three-dimensionally represented perspective drawing representing an image section as seen from an individual space angle position selected from mutually different space angle position, the address of each perspective drawing being based on its associated space angle position;

c) a second memory region (6) storing recorded measured data from strategic parts of an existing self-movable object, e.g., a living actor, the self-movable object being divided into a plurality of image sections movable in relation to one another, a space angle for a direction in space of each section being derived from said measured data from said existing self-movable object, the address for each of said perspective drawings stored in said first memory region (7) corresponding to each one of said sections being based on said recorded space angle for each section for the image to be drawn;

d) said work station (4), for each image of the graphic figure, assembling the figure in accordance with a predetermined sequential assembling schedule on a drawing medium (8, 9), section by section, by searching in the second memory region (6) for the stored space angle for an image section, providing the address in the first memory region (7) based on the read space angle, reading the memory area having this address, retrieving the perspective drawing stored at that address, and assembling the image of the graphic figure by providing each perspective drawing retrieved from the first memory section (7) of a subsequent section linked with the perspective drawing retrieved for a nearest preceding section at a joint location common to both said sections, whereby said plurality of three-dimensionally represented perspective drawings of each image section making up said assembled graphic figure depict image sections that may have different proportions than the image sections of said self-movable object used to generate said space angles.

\* \* \* \* \*